United States Patent [19]

Deaton et al.

[11] 4,182,351

[45] Jan. 8, 1980

[54] GENTLE CYCLE VALVE FOR DIGITAL DISHWASHER

[75] Inventors: Homer W. Deaton, Bellbrook; James A. Bright, Dayton, both of Ohio

[73] Assignee: White Consolidated Industries, Inc., Cleveland, Ohio

[21] Appl. No.: 966,384

[22] Filed: Dec. 4, 1978

[51] Int. Cl.² .............................................. B08B 3/02
[52] U.S. Cl. .................................. 134/58 D; 134/102
[58] Field of Search ................. 134/58 D, 95, 102; 251/70, 132

[56] References Cited

U.S. PATENT DOCUMENTS

| | | | |
|---|---|---|---|
| 925,081 | 6/1909 | Carroll | 251/70 |
| 3,314,386 | 5/1964 | Jenkins | 134/102 |
| 3,384,098 | 5/1968 | Swetnam | 134/58 D |
| 3,530,306 | 9/1970 | Guth | 361/2 |
| 3,621,856 | 11/1971 | Guth | 134/58 D |
| 3,702,680 | 11/1972 | Woehler | 134/58 D X |

Primary Examiner—Robert L. Bleutge
Attorney, Agent, or Firm—Pearne, Gordon, Sessions

[57] ABSTRACT

An improved control circuit is provided for an automatic dishwasher having a reversing relay with valve arrangement which supplies cavitation air to the fluid distribution system to reduce the energy level at which the liquid is sprayed into the wash chamber to achieve a GENTLE wash and rinse cycle for fine china and crystal. The reversing relay solenoid armature operates, in conjunction with a start relay, to provide a primary function of reversing the direction of rotation of the motor between wash and drain periods while providing an auxiliary function of opening its associated valve to admit cavitation air to the recirculation pump during a GENTLE wash and rinse cycle and closing the valve during the REGULAR wash and rinse cycle.

3 Claims, 1 Drawing Figure

U.S. Patent
Jan. 8, 1980
4,182,351
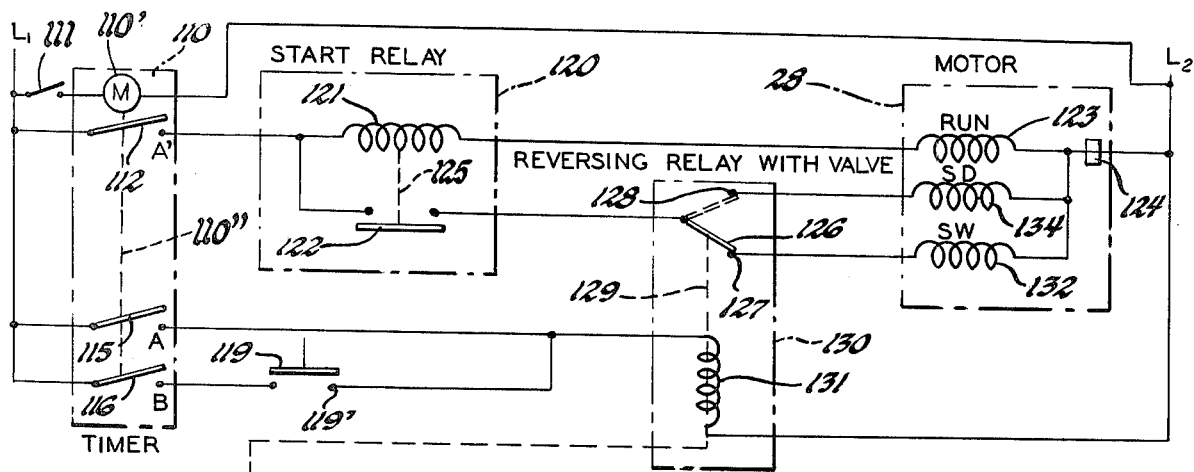
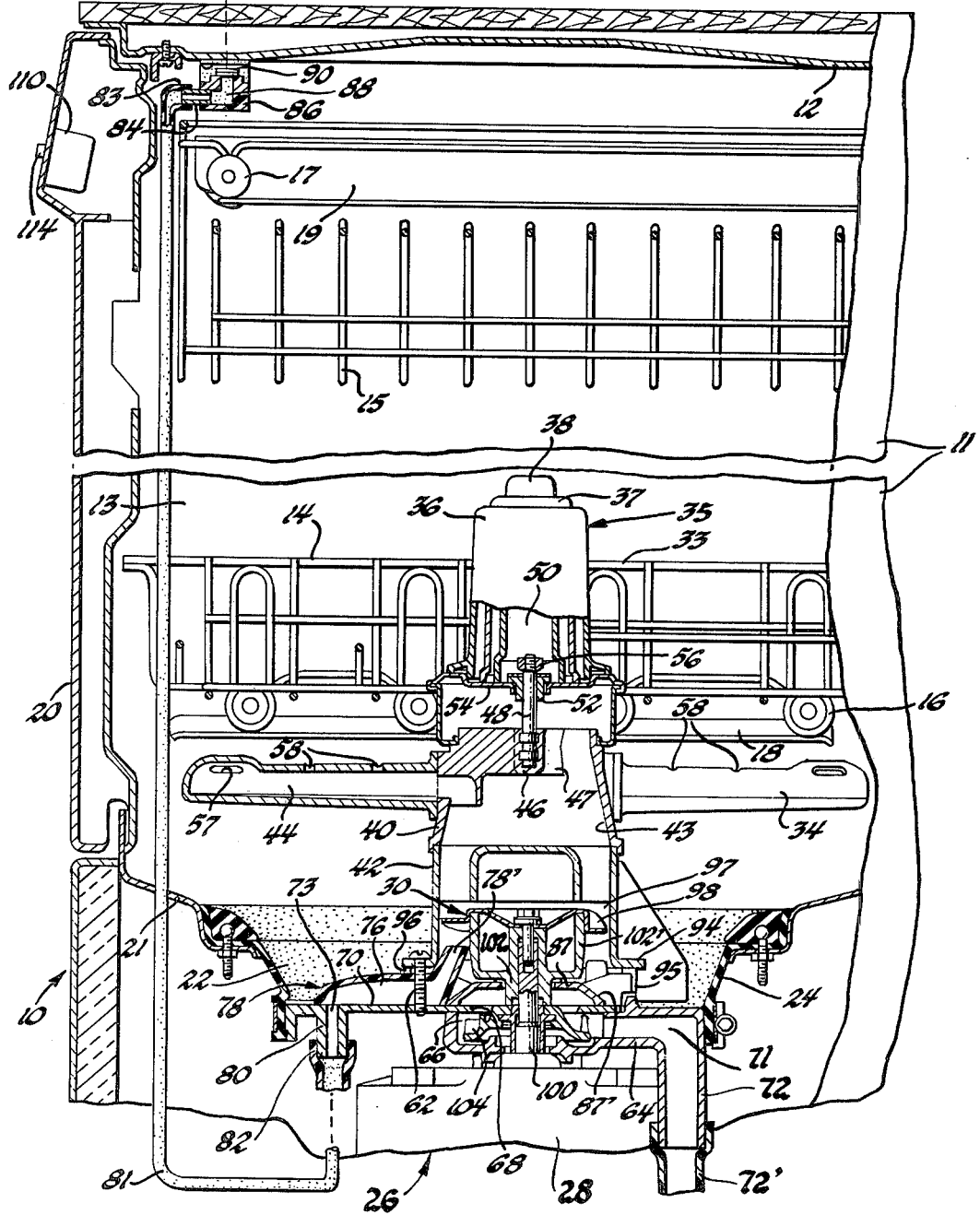

GENTLE CYCLE VALVE FOR DIGITAL DISHWASHER

The present invention relates generally to automatic dishwashers and, more particularly, to an improved valve control means for supplying air to the dishwasher fluid distribution system reducing the impinging force of washing fluids during a gentle wash cycle of the dishwasher.

Prior art dishwashers are known which include different washing actions in the same dishwasher for different articles. For selected articles, such as fine chine and crystal, a lower energy level option is desirable to provide reduced impinging force of the washing fluids achieved by means of a gentle wash cycle option. An example of a control system for an automatic dishwasher which discloses an arrangement to admit air to a dishwasher pump thereby lowering washing fluid energy level is described in U.S. Pat. No. 3,384,098, issued May 21, 1968 to N. T. Swetnam. Accordingly, it is an object of the present invention to provide a fluid distribution system for an automatic dishwasher which incorporates an improved control means for selectively opening valve means associated with a motor direction reversing relay, by utilizing the movement of the armature of the reversing relay, to supply cavitation air to the recirculating pump during a GENTLE wash and for closing the valve means during a normal or REGULAR wash.

It is another object of the present invention to provide the improved control means as set forth in the preceding object which incorporates a GENTLE wash selector switch in shunt relation to a timer direction selection switch means which together with a current sensitive start relay operates the reversing relay armature in a dual manner to provide a primary function of controlling the dishwasher motor to rotate the wash and drain pump impellers in their appropriate directions while providing an auxiliary function of electromagnetically opening and closing valve means during the GENTLE wash and rinse periods and the REGULAR wash and rinse periods, respectively.

Referring now to the drawing there is illustrated an automatic dishwashing machine 10 having an outer cabinet 11 and an inner cabinet 12. The inner cabinet 12 defines a wash chamber 13 within which are disposed lower and upper article racks 14 and 15. Each rack has associated rollers 16, 17 and guides 18, 19 to allow easy movement of the racks. A door 20, pivotal about a substantially horizontal axis, provides access to the wash chamber 13 so that dishes or other articles to be washed may be placed into the lower and upper racks 14 and 15.

The wash chamber 13 is defined at the bottom by wall 21 which has a centrally depressed portion forming a sump 22. Supported by suitable means such as a resilient sleeve 24, so as to be aligned generally in the center of the sump 22, is a pump-motor unit 26, comprising a lower motor 28 and an upper pump assembly 30. The motor pump unit 26 is disposed relative to the internal plumbing of the dishwasher to connect with a conventional drain line (not shown).

In general, the fluid distribution system includes a revolvable horizontal spray arm or fluid discharge device 34 adapted for operation beneath the lower dishrack 14 and a rotating spray column or spray tower 35 suitably affixed to the spray arm and extendable upwardly through a guard portion 33 of the lower rack. The spray tower is shown compressed of three telescoping sections 36, 37 and 38, the upper two of which pop up through rack 14 when the pump assembly is operating to distribute water or washing fluid in the dishwashing chamber. Reference may be had to U.S. Pat. No. 3,989,054 to Mercer, issued Nov. 2, 1976 for a detailed description of an example of a dishwasher system.

The spray arm 34 includes a central cylindrical downwardly directed extension 40 which circumscribes the top of tubular pump housing 42 of the motor and pump assembly to provide a downwardly opening inlet 43 to the interior 44 of the spray arm. Above the inlet opening 43 the extension 40 includes a central hub 46 on spider arms 47. A spindle 48 has one end embedded in hub 46 and its opposite end directed through a square shank bearing 52 indexed in a square opening in spray arm plate 54 and is retained at the top of a spindle 48 of the motor pump assembly by suitable fastening means such as a nut 56. The plate 54 includes a plurality of ports therein (not shown) arranged circumferentially thereabout to place the interior 44 of the hollow arm 34 in communication with the interior of the vertically extending spray column 35 of the fluid distributing system.

When the pump is operating to direct water to the interior of the spray arm 34 as during a wash or rinse cycle of the dishwashing operation, a spray pattern is produced which is usually well suited for cleaning articles within the upper rack 15. More particularly, water issuing into the interior 44 of the lower spray arm 34 will be directed therefrom at one end of the arm through fluid reaction ports 57 that are configured to produce a reactive force on the arm which in the illustrated arrangement, produces a clockwise rotation of the arm about a first access of rotation defined by the spindle 48. The arm includes a plurality of upwardly facing spaced-apart ports 58 on either side of the access of rotation thereof which direct fluid upwardly into the dishwasher chamber 13 without the imposition of a noticeable reaction on the spray arm.

The pump and motor assembly housing 42 supports the motor by suitable attaching means such as long screws 62 extending through the pump housing for fastening the motor 28 into assembled relationship. In general, the pump housing includes the vertically extending upper small diameter wall portion 42 and a vertically extending lower larger diameter housing 64 which defines a drain pump chamber 66 opened to the washing compartment 13 by a central opening 68 in cover plate 70. The cover plate 70 is supported in the upper surface of drain pump housing 64 and is secured thereto by suitable means including screw fasteners (not shown). A passageway 71 formed radially outwardly in the drain pump housing 64 communicates, by drain outlet 72 to a drain hose 72'. Aperture means 73 in the cover plate 70 communicates with the interior 76 of air directing nozzle member 78. A depending air inlet 80 is formed in the floor of drain cover plate 70. An air conduit 81 has its one end 82 connected to inlet 80 and its other or upper end 83 connected to air outlet fitting 84 of air valve housing 86. The valve interior chamber 88 is normally closed to atmosphere by a valve member 90. While the valve housing 86 is shown secured on the top inner casing 12 it will be understood that the housing 86 could be located in any convenient area of the dishwasher cabinet, such as adjacent the motor pump assembly, without departing from the scope of the invention.

The tubular pump housing 42 has a flange 94 including groups of circumferentially spaced fingers 95 depending therefrom defining pump inlet means in the form of openings 96. A flow diverter element 87 includes a surface or ramp 87' inclined upwardly from the support plate 76 for diverting fluid from sump 22 through the inlet openings 96 to cylindrical upper wash and rinse pumping chamber 97 containing upper axial flow impeller 98 of the pump assembly. The impeller 98 is shown secured to the upper end of the rotable motor shaft 100 extending through a bore in the pump central hub 102. Radially extending blades of the wash and drain or recirculating impeller 98 effect a desired pumping action within the chamber 97. The pump motor shaft 100 has secured thereto at its lower end a drain impeller 104 located within the pump lower drain housing 66. Thus, upon being rotated in a counterclockwise direction outwardly directed drain impeller vanes draw water from the sump 22 through the drain openings 96. The cover plate 70 operates as a separator to separate the drain flow from the fluid path throuth the recirculating pump housing chamber. During rotation of the upper wash and rinse impeller 98 in a clockwise direction, water is drawn from the wash chamber 13 and pumped into the spray arm 34 and spray tower 35.

Reference may now be had to the upper portion of the drawing wherein the improved dishwashing control means or gentle wash cycle of this invention is embodied and controlled by the portion of the dishwasher cycle schematic diagram illustrated. Like components of the schematic diagram carry identical numbers to those used on the various parts of the dishwasher described hereinbefore. The circuit receives power from a 115 volt power supply $L_1$, $L_2$ for energizing the components of the control circuitry. The sequentially operated circuitry of the dishwasher is controlled by timer 110 including a timing motor 110' which is selectively energized by a manual push-pull switch 111 for starting the timer motor 110' whenever the timer control knob 114 is depressed. The timing motor 110' is adapted to intermittently rotate a timer camshaft 110'' to selectively and sequentially open and close a plurality of cam actuated switches, indicated by movable switch blades, including switches 112, 115 and 116 to open and close their associated fixed contacts A', A and B, respectively.

A normally open gentle cycle selector switch 119 is located in series with timer switch 116. The on-off switch 112 is shown connected from power supply lead $L_1$ through start switch 111 and a start relay 120 for controlling the starting sequence of the motor 28. The start relay 120 has a solenoid coil 121 and armature 125 for controlling its normally open power switch 122. The start relay solenoid coil 121 is connected in series with through run winding 123 of the motor 28 and a motor overload device 124 to power supply lead $L_2$.

A reversing relay with valve, generally indicated at 130 in the schematic, is provided for a primary function of controlling the operational direction of the motor 28. The forward and reverse operation of the motor 28 is controlled by the selective positioning of reversing relay switch, shown as a single pole-double throw switch. The reversing switch includes a switch blade 126 movable from its normal solid-line position contacting its fixed contact 127 to its broken-line position contacting fixed contact 128 upon the energization of reversing relay solenoid coil 131. Thus, switch blade 126 is shown normally closed to its fixed contact 127 by armature 129 of unenergized solenoid 131. The timer 110 operates to place start wash and rinse motor winding 132 in series with momentary closed power switch 122 starting the rotation of the motor shaft 100 in a first or clockwise direction. Upon the reversing relay coil 131 being energized by the timer 110 the switch blade 126 is moved by armature 129 to its fixed contact 128 to place motor start drain winding 134 in series with the start switch 122 causing the rotation of the motor shaft 100 in a second or counterclockwise direction.

It will be noted that the reversing relay solenoid coil armature 129 has a secondard or auxiliary function of controlling the valve element 90 of the air valve 86. Thus, upon the reversing relay solenoid coil 131 being energized its armature 129 movement achieves the dual action of moving switch blade 126 from its one fixed contact 127 to its other fixed contact 128 while at the same time moving valve element 90 from its closed position to its open position providing communication between the inlet 83 of air conduit 81 with ambient or room air.

In a manner to be described applicant's control system functions such that whenever the gentle cycle switch 119 is closed to its contacts 119' the dishwasher operates in a GENTLE wash or rinse phase wherein the valve element 90 will be opened while the motor shaft 100 is rotating the recirculate impeller 98 in a first pumping direction, which in the form shown is a clockwise direction. This allows air to enter conduit 81 and pass through air inlet 80 and plate aperture 73 into the nozzle interior 76. As seen in the drawing, the nozzle member has its outlet 78' positioned at the inlet of the recirculation pump chamber 97, defined intermediate the pump housing 42 and its hub cap portion 102'. As a result of the impeller 98 rotating in its wash mode, a suction is exerted through recirculate pump chamber 97 tending to draw a predetermined amount of air through the conduit 81 into the chamber 97. This amount of air introduced into the inlet of the pump chamber 97 is sufficient to substantially decrease the rate at which liquid is pumped up into the liquid distribution inlet 43. As a result, there is a lower energy level of the liquid passing into spray arm interior 44 and tower interior 50 thereby providing reduced impinging forces on articles in the chamber 13 throughout a selected GENTLE wash.

In operation a normal WASH load cycle is achieved by manually setting the timer control knob 114 at the normal load position and depressing same closing the timer motor on-off switch 111 and energizing the timer mechanism. After an initial pause a fill valve (not shown) is energized by its timer contacts closing to effect filling of the sump 22 to a predetermined water level. Timer contact 112 is next closed to fixed contact A' to effect energization of the motor 28 through the start relay solenoid coil 121 in one manner, i.e. by a start current, momentarily closing start relay switch 122. Switch 122 is closed for a predetermined time interval, measured in fractions of a second, which serves, with reversing relay switch blade 126 contacting contact 127, to energize the start wash winding 132 for the brief time interval until the motor 28 comes up to its designed running speed and current draw in the main run winding 123 and the start relay coil drops-off so as to be energized in another manner, i.e. by running current, whereby armature 125 opens switch 122. Upon the opening of switch 122 the timer mechanism causes switch blade 116 to close to its fixed contact "B."

The result is the motor 28 will be energized to rotate its shaft 100 and impeller 98 in its clockwise or recirculation direction pumping fluid to the spray arm 34 and the spray column 35 during normal or REGULAR wash and rinse. It will be noted that for a normal wash cycle the timer switch blade 115 remains open. During the liquid flow from the sump 22 to the recirculation chamber 97 a non-pumping condition is effected in the drain pump by the clockwise rotation of the drain pump impeller 104.

Through control of the electrical circuit by the timer mechanism a regular drain period is initiated during a normal wash wherein the timer causes the switch blades 112 and 115 to close to their fixed contacts A' and A thereby energizing start relay coil 121 and reversing relay coil 131 respectively, causing the reversing relay armature 129 to move switch blade 126 from its fixed contact 127 to its fixed contact 128. Closed motor switch 112 initiates a high current draw in coil 121 causing momentary closure of the start relay switch 122 resulting in the motor start drain winding 134 being initially energized. The above sequence produces a reversal of direction of motor rotation to effect rotation of the drain impeller 104 in its opposite or counterclockwise pumping mode drawing fluid from the sump for discharge through the drain outlet 72.

A china and crystal or GENTLE wash and rinse cycle is achieved by the operator manually closing the selector switch 119 to its fixed contacts 119'. When the timer push-pull switch 111 is closed the timer motor 110' is energized. After the fill valve (not shown) is energized to fill the sump with water the motor switch 112 is closed. The timer mechanism initially maintains switches 115 and 116 in their open positions from their respective fixed contacts "A" and "B" to allow the motor 28 to start rotation in its wash and rinse direction, i.e. clockwise direction for the form shown. This is achieved by energization of the start relay solenoid coil 121 in one manner, (high start current) momentarily closing start relay switch 122. Switch 122 is closed for a predetermined momentary time interval with switch blade 126 in its solid line position at contact 127, to energize the start wash winding 132 for the mentioned time interval. Upon the motor 28 achieving its designed running speed current flow in the main run winding 123 and the start relay coil diminishes so as to energize the motor 28 in another manner, i.e. by running current.

Thus, in applicant's control system the motor will be energized to rotate impeller 98 in its clockwise of fluid recirculation direction pumping cavitated fluid to the spray arm 34 and the spray column 35 during GENTLE wash and rinse. It will be noted that in the GENTLE wash and drain the timer mechanism causes switch blade 116 to close to its fixed contact "B" only upon the opening of the start switch 122 after the momentary time interval required for the motor 28 to reach its run speed. The result is that during the GENTLE wash cycle the reversing relay 131 is now energized by its connection across power lines L₁ and L₂ by means of closed switches 116 and 119 causing the first or reversing relay armature 129, being connected to valve means element 90, to be moved electromagnetically in one direction to open the valve element 90 thus supplying room or ambient air in the manner described, to provide the reduced impinging force of the washing fluids in the chamber 13. It will be noted that in the form shown, by virtue of the armature 129 moving upward to open the valve element 90, it also causes the switch blade 12 of the reversing relay to move from its fixed contact 127 to its fixed contact 128. With start relay switch 122 open, however, the position of the switch blade 128 has no effect on the control circuit.

Upon the timer mechanism 10 advancing into its GENTLE drain mode the timer 110 causes switches 112 and 115 to close to their fixed contacts A' and A providing a shunt circuit to energize the reversing relay 131. Closed switch 115 results in armature 129 moving switch blade 126 into contact with its fixed contact 128. Closed switch 112, via energizing coil 121 and momentarily closing switch 122 thus enables the circuit to energize motor start drain winding 134. The shunt circuit of timer switch blades 115 functions to energize the reversing relay coil 131 at the start of the GENTLE drain operation for at least the momentary time interval during which switch 122 is opened by its start relay or second armature 125 to start the motor shaft rotation in its drain direction.

It will be noted that the valve member 90 can be in either its open or closed position during the drain period as the recirculating pump impeller 98 is being rotated by the motor 28 in its counterclockwise or non-pumping direction while the drain impeller 104 is being rotated in its counterclockwise or pumping direction.

Applicant's invention has been disclosed in the environment of a conventional timer motor controlled automatic dishwasher. It will be understood, however, that the invention may be incorporated with a computerized controlled dishwasher wherein digital logic circuits are used to replace the disclosed timing mechanism requiring a timing motor and cam actuated contacts.

While the embodiment of the present invention as herein disclosed constitutes a preferred form, it is to be understood that other forms might be adopted.

The embodiments of the invention in which an exclusive property or privilege is claimed are defined as follows:

1. In a fluid distribution system for a dish washing chamber, means for distributing washing fluid during a regular wash at a predetermined impinging force on dishes and the like in said chamber, a motor controllable for actuating such fluid distributing means to provide said predetermined impinging force and having wash and drain modes of operation in accordance with the operational direction of the motor, valve means controllable for supplying air to said fluid distributing means during actuation thereof to reduce the predetermined impinging force of washing fluid on the dishes and the like to provide a gentle wash, and control means for selectively controlling said motor and said valve means to provide said regular wash and said gentle wash, said control means comprising a reversing relay having a reversing switch for controlling the operational direction of said motor, an armature for moving said reversing switch and direction selector means adapted for interconnecting a power source and said reversing relay for moving said armature, a current sensitive start relay having a coil adapted for interconnecting a power source and said motor during its wash and drain modes of operation and a start switch closable electromagnetically when said coil is energized in one manner for conditioning said reversing switch to select the operational direction of the motor and normally openable after a predetermined time interval when said coil is energized in another manner, and gentle wash selector means in shunt relation to said direction selector means and adapted for interconnecting a power source and said reversing relay for moving said armature to select said gentle wash after said predetermined time interval, the armature of said reversing relay being connected to said valve means and movable electromagnatically to open said valve means for supplying air to provide the reduced impinging force of washing fluids and, thus, said gentle wash, the armature of said reversing relay continuing to maintain said valve means open irrespective of said direction selector means, thereby to provide said reduced impinging force throughout said gentle wash.

2. In a fluid distribution system for a dishwashing chamber, means for distributing washing fluid during a regular wash at a predetermined impinging force on dishes and the like in said chamber, a motor controllable for actuating such fluid distributing means to provide said predetermined impinging force and having wash and drain modes of operation in accordance with the operational direction of the motor, valve means controllable for supplying air to said fluid distributing means during actuation thereof to reduce the predetermined impinging force of washing fluid on the dishes and the like to provide a gentle wash, and control means for selectively controlling said motor and said valve means to provide said regular wash and said gentle wash, said control means comprising a reversing relay having a single pole-double throw reversing switch and a coil for controlling the operational direction of said motor, a first armature associated with said reversing switch coil for moving said reversing switch and direction selector means adapted for interconnecting a power source and said reversing relay coil for moving said armature, a current sensitive start relay having a coil operating on an associated second armature adapted for interconnecting a power source and said motor during its wash and drain modes of operation and a start switch closable by said second armature when said start relay coil is energized by the motor starting current for conditioning said reversing switch to select the operational direction of the motor and normally openable after a predetermined time interval when said start relay coil is energized by the motor running current, and gentle wash selector means adapted for interconnecting a power source and said reversing relay coil for moving said first armature to select said gentle wash after said predetermined time interval, said first reversing relay armature being connected to said valve means and movable by said reversing switch coil to open said valve means for supplying air to provide the reduced impinging force of washing fluids and, thus, said gentle wash, said first reversing relay armature continuing to maintain said valve means open irrespective of said direction selector means, thereby to provide said reduced impinging force throughout said gentle wash.

3. In a fluid distribution system for a dishwashing chamber, means for distributing washing fluid during a regular wash at a predetermined impinging force on dishes and the like in said chamber, a motor controllable for actuating such fluid distributing means to provide said predetermined impinging force and having wash and drain modes of operation, valve means controllable for supplying air to said fluid distributing means during actuation thereof to reduce the predetermined impinging force of washing fluid on the dishes and the like to provide a gentle wash, and control means for selectively controlling the wash and drain modes of operation for said motor and said valve means to provide said regular wash and said gentle wash, said control means comprising an operational mode relay having an operational mode switch for controlling the operational modes of said motor, an armature for moving said operational mode switch, and operational mode selector means adapted for interconnecting a power source and said operational mode relay for moving said armature, start means for interconnecting a power source and said motor during its wash and drain modes of operation including a start switch closable when said start means is interconnecting said power source and said motor in one manner for conditioning said operational mode switch to select the operational mode of the motor and openable by said start means after a predetermined time interval when said start means is interconnecting said power source and said motor in another manner, and gentle wash selector means in shunt relation to said operational mode selector means and adapted for interconnecting a power source and said operational mode relay for moving said armature to select said gentle wash after said predetermined time interval, the armature of said operational mode relay being connected to said valve means and movable to open said valve means for supplying air to provide the reduced impinging force of washing fluids and, thus, said gentle wash, the armature of said operational mode relay continuing to maintain said valve means open irrespective of said operational mode selector means, thereby to provide said reduced impinging force throughout said gentle wash.

* * * * *